US012794546B2

(12) United States Patent
Medeiros De Amorim et al.

(10) Patent No.: US 12,794,546 B2
(45) Date of Patent: Nov. 10, 2026

(54) MANAGEMENT OF UPDATES IN SCHEDULING OFFSET VIA SYSTEM INFORMATION AND SOFT INDICATION OF SYSTEM INFORMATION MODIFICATION

(71) Applicant: Nokia Technologies Oy, Espoo (FI)

(72) Inventors: Rafhael Medeiros De Amorim, Aalborg (DK); Frank Frederiksen, Aalborg (DK); Konstantinos Manolakis, Munich (DE)

(73) Assignee: Nokia Technologies Oy, Espoo (FI)

( * ) Notice: Subject to any disclaimer, the term of this patent is extended or adjusted under 35 U.S.C. 154(b) by 396 days.

(21) Appl. No.: 18/681,729

(22) PCT Filed: Oct. 19, 2022

(86) PCT No.: PCT/EP2022/079002
§ 371 (c)(1),
(2) Date: Feb. 6, 2024

(87) PCT Pub. No.: WO2023/078675
PCT Pub. Date: May 11, 2023

(65) Prior Publication Data
US 2024/0364416 A1 Oct. 31, 2024

Related U.S. Application Data

(60) Provisional application No. 63/276,332, filed on Nov. 5, 2021.

(51) Int. Cl.
*H04B 7/185* (2006.01)
*H04W 48/08* (2009.01)

(52) U.S. Cl.
CPC ........ *H04B 7/18513* (2013.01); *H04W 48/08* (2013.01)

(58) Field of Classification Search
CPC ............ H04B 7/18513; H04B 7/18563; H04B 7/18519; H04B 7/18543; H04W 48/08
See application file for complete search history.

(56) References Cited

U.S. PATENT DOCUMENTS 10,356,695 B2 7/2019 You et al.
2023/0038675 A1* 2/2023 Wang ................ H04B 7/18513

FOREIGN PATENT DOCUMENTS

WO WO-2021062666 A1 * 4/2021 ........ H04W 74/0833

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

(Continued)

*Primary Examiner* — Natasha W Cosme
(74) *Attorney, Agent, or Firm* — Nokia Technologies Oy

(57) ABSTRACT

Systems, methods, apparatuses, and computer program products for management of updates in scheduling offset via system information and soft indication of system information modification are provided. For example, a method can include identifying, by a user equipment, a time of application of a new non-terrestrial-network system information. The method may also include waiting to apply the new non-terrestrial-network system information until the time of application. The method may further include applying the new non-terrestrial-network system information at the time of application, conditioned on the new non-terrestrial-network system information being received before the time of application.

20 Claims, 6 Drawing Sheets

(56) References Cited

OTHER PUBLICATIONS

"3rd Generation Partnership Project; Technical Specification Group Radio Access Network; NR; Physical layer procedures for control (Release 16)", 3GPP TS 38.213, V16.7.0, Sep. 2021, pp. 1-188.
International Search Report and Written Opinion received for corresponding Patent Cooperation Treaty Application No. PCT/EP2022/079002, dated Feb. 3, 2023, 11 pages.
"Time and frequency synchronization for IoT NTN", 3GPP TSG RAN WG1 Meeting #106, R1-2107942, Agenda: 8.15.1, Lenovo, Aug. 16-27, 2021, 4 pages.

* cited by examiner

MANAGEMENT OF UPDATES IN SCHEDULING OFFSET VIA SYSTEM INFORMATION AND SOFT INDICATION OF SYSTEM INFORMATION MODIFICATION

RELATED APPLICATION

This application was originally filed as a Patent Cooperation Treaty Application No. PCT/EP2022/079002 filed on Oct. 19, 2022, which claims priority of a U.S. Provisional Application No. 63/276,332 (filed on Nov. 5, 2021), both of which are hereby incorporated in their entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for management of updates in scheduling offset via system information and soft indication of system information modification.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform identifying, by a user equipment, a time of application of a new non-terrestrial-network system information. The at least one memory and computer program code can also be configured, with the at least one processor, to cause the apparatus at least to perform waiting to apply the new non-terrestrial-network system information until the time of application. The at least one memory and computer program code can further be configured, with the at least one processor, to cause the apparatus at least to perform applying the new non-terrestrial-network system information at the time of application, conditioned on the new non-terrestrial-network system information being received before the time of application.

An embodiment may be directed to an apparatus. The apparatus can include at least one processor and at least one memory comprising computer program code. The at least one memory and computer program code can be configured, with the at least one processor, to cause the apparatus at least to perform providing, to a user equipment, a message indicating that an existing non-terrestrial-network system information will be modified. The at least one memory and computer program code can also be configured, with the at least one processor, to cause the apparatus at least to perform identifying a time of application of a new non-terrestrial-network system information. The at least one memory and computer program code can further be configured, with the at least one processor, to cause the apparatus at least to perform transmitting the new non-terrestrial-network system information toward a user equipment.

An embodiment may be directed to a method. The method may include identifying, by a user equipment, a time of application of a new non-terrestrial-network system information. The method may also include waiting to apply the new non-terrestrial-network system information until the time of application. The method may further include applying the new non-terrestrial-network system information at the time of application, conditioned on the new non-terrestrial-network system information being received before the time of application.

An embodiment may be directed to a method. The method may include providing, to a user equipment, a message indicating that an existing non-terrestrial-network system information will be modified. The method may also include identifying a time of application of a new non-terrestrial-network system information. The method may further include transmitting the new non-terrestrial-network system information toward a user equipment.

An embodiment may be directed to an apparatus. The apparatus may include means for identifying, by a user equipment, a time of application of a new non-terrestrial-network system information. The apparatus may also include means for waiting to apply the new non-terrestrial-network system information until the time of application. The apparatus may further include means for applying the new non-terrestrial-network system information at the time of application, conditioned on the new non-terrestrial-network system information being received before the time of application.

An embodiment may be directed to an apparatus. The apparatus may include means for providing, to a user equipment, a message indicating that an existing non-terrestrial-network system information will be modified. The apparatus may also include means for identifying a time of application of a new non-terrestrial-network system information. The apparatus may further include means for transmitting the new non-terrestrial-network system information toward a user equipment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing management of updates in scheduling offset via system information and soft indication of system information modification, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

The usage of cellular communication over non-terrestrial networks (NTNs) may have some similarities to procedures used commonly in terrestrial networks, but the much greater distances involved between the radio access network element and the user equipment also may lead to changes in at least some of the procedures.

Certain embodiments relate to the uplink (UL) timing for transmission adopted at the user equipment (UE) side. The timing advance procedures (TA) in NTNs may be affected by the very large delays observed for the propagation of the signal in the physical interface. The TA may be used to compensate for a propagation delay, $\tau$, between the UE and the gNb.

Figure 1B:
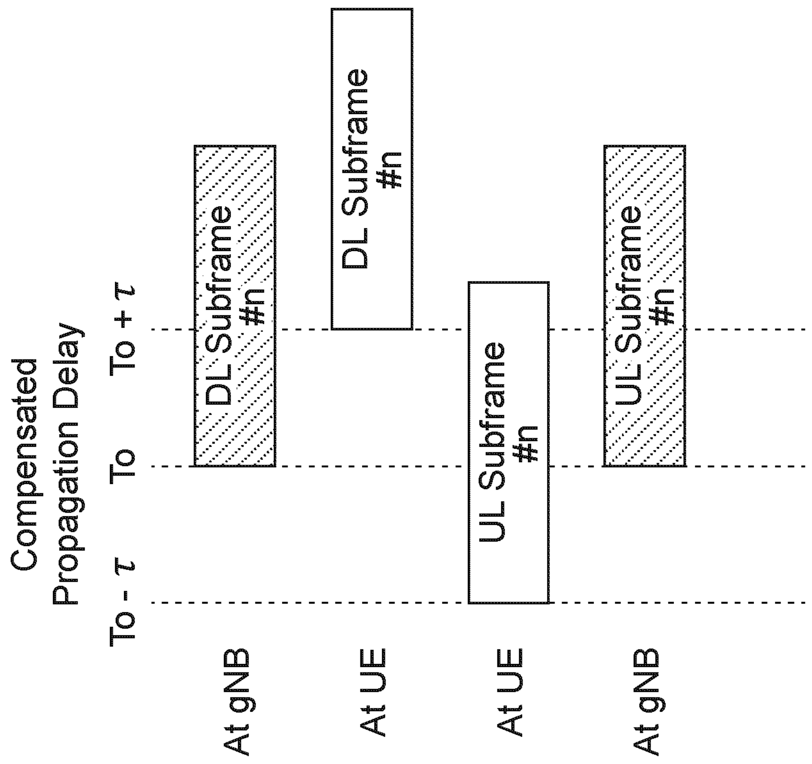
FIG. 1B shows timing in a compensated system.
Figure 1A:
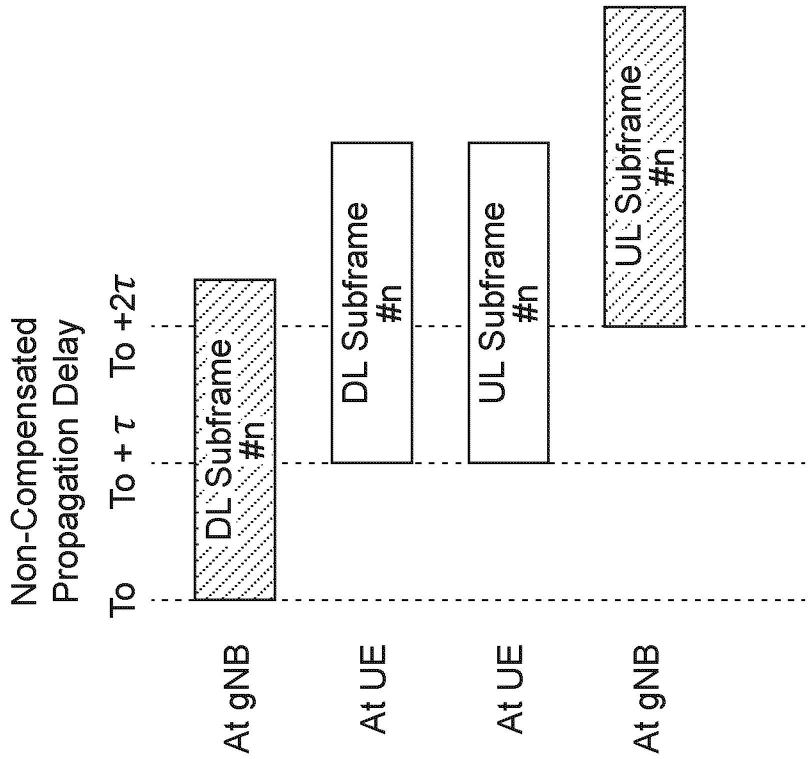
FIG. 1A shows timing in a non-compensated system.

FIGS. 1A and 1B show a comparison of timing at different points of the system, when there is no Timing Advance on the UE, FIG. 1A, and when there is timing advance on the UE, FIG. 1B. Thus, FIGS. 1A and 1B can illustrate differences between a system with and without timing advance, to compensate for a propagation delay of $\tau$.

As shown in FIG. 1A, if the gNB begins transmission of the DL subframe #n at $T_0$, that DL subframe will be received at the UE at a later time, namely at $T_0+\tau$. Similarly, if the UE begins transmission of UL subframe #n at $T_0+\tau$, then that UL subframe will be received at the gNB at $T_0+2\tau$. By contrast, if the delay is taken into account, as shown in FIG. 1B, then the UL subframe can be transmitted beginning at $T_0-\tau$, and the DL subframe can be received at $T_0+\tau$. In this way, for example, the UL and DL can be time separated at the UE, while being simultaneously processed at the gNB.

More significantly for system design, the TA operation can be used to ensure that the propagation delay differences between different UEs are compensated, so that it is possible to time-multiplex different UEs without the tail of one UE's transmission overlapping with the start of another UE's transmission, for more than a predefined time window, typically determined by the cyclic prefix (CP) applied to each OFDM symbol. Also, in an OFDM system the frequency-multiplexed UEs need to be time-aligned so that they do not interfere with each other.

In the low-earth orbit (LEO) scenarios the distance between a UE on the surface of Earth and the satellite may vary from around 300 to 2500 km. The total distance between the UE and the gNB may be twice as large for a transparent architecture, when the satellite acts as a relay or remote radiohead for a gNB located on the ground. For middle-earth orbit (MEO) (typically around 7000 km to 25000 km) and geo-stationary earth orbits (GEO) (around 35786 km) these values may be much higher. Specifically, for example, the expected round-trip time (RTT) delays in an NTN scenario with a LEO gNB may be 2 ms in the regenerative case (the case where the satellite functions as the gNB) and 48.6 ms in the transparent case, where the satellite relays to or acts as a remote radio head for a ground-based gNB. For MEO, the respective RTTs are 46.7 ms for the regenerative case and 395.1 ms for the transparent case. Finally, for GEO, the respective RTTs are 238.6 ms for the regenerative case and 541.1 ms for the transparent case. For satellites above geostationary orbit, the delays would continue to increase. For example, the average distance to the moon is about 384,400 km, and RTT may be on the order of a 2.5 to 3 seconds.

Because of these very large delays, in NTN, the total timing advance to be applied by a single UE is much higher than the values usually observed in terrestrial networks for fourth generation (4G) and fifth generation (5G) scenarios, which typically are below 1 ms, and at very extreme cases approximate 2 ms.

Some downlink-uplink (DL/UL) timing relationships may need to operate differently when a large TA is being applied. The large RTT may complicate the signaling and procedures running between the UE and the gNB. For example, a DL DCI received by the UE at downlink slot n providing an UL scheduling allocation for this UE, may allocate an UL transmission at uplink slot n+k. The maximum value allowed for "k" in 3GPP specifications may be a duration that is much less than the TA values expected for NTN, which means the allocation cannot be attended by the UE, as the UL slot n+k will already effectively lie in the past when the UE receives the scheduling allocation in the DL. Because of this, a new term called K_offset or $K_{offset}$ may be added to the equation of n+k. This additional offset may allow the gNB to time-shift the scheduling assignments provided to the UE, considering the unavoidable RTT delays. Moreover, the offset may provide more flexibility to time-align UL transmissions from UEs allocated in different locations in a cell and ensure that the UL transmissions of such UEs may reach the gNB in a time-synchronized way.

K_offset may be used to enhance the following timing relationships: the transmission timing of downlink control information (DCI) scheduled physical uplink shared channel (PUSCH) including channel state information (CSI) on PUSCH; the transmission timing of random access response (RAR) grant scheduled PUSCH; the transmission timing of hybrid automatic repeat request acknowledgment (HARQ-ACK) on PUCCH; the CSI reference resource timing; the transmission timing of aperiodic SRS; downlink and uplink timing difference at a base station; or application of medium access control (MAC) control element (CE) procedures. The offset value may also be used with additional timing relationships that require K_offset or K_mac of the same or different values to those in the preceding list.

Timing advance and Doppler shift experienced for UEs in different parts of the same NTN cell may differ quite significantly, and in values much higher than the values that are usually tracked in terrestrial only deployments.

A new radio (NR) NTN UE in radio resource control (RRC) connected mode (RRC_CONNECTED) state may be capable of at least using an acquired global positioning system (GPS) or global navigation satellite system (GNSS) position and satellite ephemeris to perform frequency pre-compensation to counter Doppler shift experienced on the service link.

Moreover, an NTN UE in RRC_CONNECTED state may support UE-specific TA calculation based at least on the UE's GPS or GNSS-acquired position and the serving satellite ephemeris.

A validity duration, configured by the network for satellite ephemeris data, may indicate the maximum time during which the UE can apply the satellite ephemeris without having acquired new satellite ephemeris.

A cell may broadcast ephemeris data for the satellite through which the cell is provided. The ephemeris data can be provided using two or more different formats and can define the satellite's position in space. The ephemeris data may be helpful for calculating an accurate RTT between the UE and the satellite.

Serving-satellite ephemeris broadcast may be supported based on one or more of the following sets. A first set may be satellite position and velocity state vectors, for example, position X, Y, Z in earth-centered earth-fixed coordinates (ECEF) in meters (m), velocity VX, VY, VZ in ECEF in meters per second (m/s).

A second set can be at least the following parameters in orbital parameter ephemeris format: semi-major axis $\alpha$ (in meters), eccentricity e, argument of periapsis $\omega$ (in radians), longitude of ascending node $\Omega$ (in radians), inclination i (in radians), mean anomaly M (in radians) at epoch time.

Optionally, a pre-provisioned ephemeris based on orbital elements can be used as reference. After, delta corrections can be broadcast in order to reduce the overhead of data being transmitted.

There may be two levels of providing the K_offset from the gNB to the UEs. One level may be cell level or any other aggregated level, such as beam, beam group, or group of UEs. This level may be transmitted in the system information (SI). Another level may be UE-specific level. This level may be managed by the next generation node B (gNB) and may be updated using a medium access control (MAC) control element (CE) (MAC-CE) command.

Because of the nature of the earth-fixed cell scenarios in NTN, where a satellite adjusts the coverage beam as the satellite moves in the orbit, to cover the same region on Earth for the duration of a fly-over, the average and minimum delays expected between UEs and the satellite may change considerably over time.

Due to the large deviation of the RTT changing during a satellite fly-over, the minimum required K_offset in order to enable the UL transmissions and procedures may vary considerably over time. In order to allow for efficient coordination, instead of only enabling very conservative values, which would lead to potentially unused resources, the value of K_offset may be changed over time. For example, the value of the cell-specific K_offset may be updated in SI via a SI modification and/or update.

In terrestrial-only implementations, other than system information block (SIB) one (SIB1) configuration, there was no SI value that was actively used by UEs in RRC connected mode that needed to be adjusted in real time and whose time understanding needs to be very tightly coupled in the UE and the gNB at the same time. Thus, terrestrial-only implementations did not define an expected behavior of the UE in connected mode when receiving an SI update or modification information that requires synchronous updates at both ends at the same time. Although these approaches are described as terrestrial-only, because they may be best suited to terrestrial use cases, some of these approaches may not be explicitly limited only to terrestrial uses cases. For ease of reference, therefore, these approaches are mentioned as terrestrial-only in this discussion.

Certain embodiments, however, may help to identify the acquisition time for the UE. Moreover, certain embodiments may determine a point at which the information becomes valid for the UE, such that the gNB also knows when the UE is applying the updated information.

Ephemeris may be updated quite often, so as to provide UL time synchronization to the UE. These updates may not trigger SI modification procedure, because that may result in the UE attempting to re-acquire the NTN SI, and consequently reacquiring all other mandatory system information. For example, the UE may apply an SI acquisition procedure to acquire the access stratum (AS) and non-access stratum (NAS) information. The procedure can apply to UEs in RRC idle mode (RRC_IDLE), in RRC inactive mode (RRC_INACTIVE), and in RRC_CONNECTED.

A validity timer can be used to prevent the UE from continually re-acquiring ephemeris when the UE can use the same information extrapolated for longer periods, such as from 10 to 30 seconds. At the same time, running this validity timer at the UE may ensure that the UE will not be using information that is outdated due to satellite movement, including ephemeris information or other system information this timer may be associated with. In case the timer expires and the UE has not acquired new information to restart the timer, the UE can assume that the UE has lost UL synchronization.

On the other hand, the network does not mandate the UE to update the ephemeris information, and may therefore just repeat the same ephemeris data and convey the appropriate epoch or age for that information. The reason for potentially sending the same ephemeris information in multiple SIBs is to provide sufficiently often the opportunity for the UEs to acquire this, and to avoid delays due to waiting times, especially for UEs performing initial access. The epoch time can provide information on the time when this information is valid and can be used by the UE.

Under the framework as described above, if the UE tries to renew the validity timer by re-acquiring the SIB, the UE may potentially not be able to acquire new information, because the information that the UE reads may still be the same as or just as aged as the information the UE acquired earlier. As of now, the epoch time and validity timer associated with this epoch time do not provide any indication to the UE on when the gNB updates the content of the ephemeris information it provides via the SIB. It may be beneficial for the UE to know when new information is available for ephemeris, for example before acquiring the SI frequently and wasting computational resources and power.

In short, when NTN-specific information is signaled to the UEs using the signaling framework from terrestrial 5G NR, different parts of the NTN-specific information may need to be provided by the network or need to be acquired by the UE at different frequency rates. The different parts and/or different frequency rates may depend on the UE situation and scenario, or may depend on whether/when this information is updated by the gNB.

Some NTN information in SI (such as cell-specific K_offset) may be updated at different times by the gNB and the reacquisition of the updated value is expected to be performed as soon as possible by the UEs, as the UEs' UL transmissions may be dependent on such information. For example, such information may be needed to be able to follow and correctly apply the scheduling assignment commands.

The SI modifications caused by NTN parameters may be triggered more often than other SI modifications. In some cases, the UE may want to skip reading unnecessary (unmodified) SIs. Likewise, it may facilitate and save significant power if the UE does not re-acquire other SIs unnecessarily.

The UEs may need to reacquire ephemeris information to renew the validity timer before the timer expires. Therefore, the UEs may need to know when the ephemeris data will be updated by the gNB in the SI, in order to avoid unnecessary SI readings and also in order to avoid the risk of not restarting the validity timer before its expiration. On the other hand, this UE behavior may need to avoid triggering SI modification. Avoiding triggering such SI modification can help to prevent every UE in the network from needing to reacquire the SI, for example when most of them may still have a validity timer which is far from expiration.

Certain embodiments may enable more power saving at the UE side and may minimize the number of procedures, without costing unnecessary SI reads for all other UEs. In the above explanation, the illustration of ephemeris was used as an example, but the same may be the case for common delay/common timing advance, without loss of generality. The same validity timer can potentially be applied for further information (for example, Common TA), or different validity timers may be applied for each.

Specifications for modifications in the SI divide the timeline of the gNB into modification periods. In other words, there are segments in time (boundaries of the modification periods) that define the moments SIs can be updated. The modification, according to such specifications, has first to be notified in one modification period, via a short message transmitted via paging, and then modified on the next modification period.

The UE can receive indications about SI modifications and/or PWS notifications using a short message transmitted with paging radio network temporary identifier (P-RNTI) over downlink control information (DCI). The short message format can be an 8-bit format, with bits 4-8 not used and ignored by the UE if received.

Bit 1 can by a systeminfoModification bit. If this bit is set to 1, that can indicate a broadcast control channel (BCCH) modification other than system information block 6 (SIB6), SIB7, and SIB8.

Bit 2 can be an etwsAndCmasIndication bit. If this bit is set to 1, that can indicate an earthquake and tsunami warning system (ETWS) primary notification and/or ETWS secondary notification and/or a commercial mobile alert system (CMAS) notification.

Bit 3 can be a stopPagingMonitoring bit. If this bit is set to 1, that can indicate that the UE may stop monitoring physical downlink control channel (PDCCH) occasion(s) for paging in this paging occasion. This bit may be used only for operation with shared spectrum channel access and if other conditions are met.

Whereas modification in any of the regular SIBs is indicated in the first bit, the inclusion of emergency SIBs used for earthquake and tsunami warning system and/or commercial mobile alert system in the next modification period can be indicated separately. The behavior of the UE upon receiving a short message with indication of modification in the next modification period can be specified.

For example, if the UE receives a short message, depending on various factors the UE can acquire the SIB1, SIB6, SIB7, and/or SIB8. Moreover, if the systemInfoModification bit of the short message is set, the UE can apply the SI acquisition procedure from the start of the next modification period.

In certain cases, however, there is no exact time indication as to what point in time the UE acquires each of the new SIs. Instead, like the measurement gaps cited above, the specifications may permit SI acquisition to be left for UE implementation.

The UE may assume that, in the SI window, PDCCH for an SI message is transmitted in at least one PDCCH monitoring occasion corresponding to each transmitted SSB and thus the selection of SSB for the reception SI messages can be left up to UE implementation.

When acquiring an SI message, the UE can determine the start of the SI-window for the concerned SI message. For the concerned SI message, the UE can determine the number n which corresponds to the order of entry in the list of SI messages configured by schedulingInfoList in si-SchedulingInfo in SIB1. The UE can also determine the integer value $x=(n-1)\times w$, where w is the si-WindowLength. The SI-window can start at the slot #a, where $a=x \bmod N$, in the radio frame for which SFN mod T=FLOOR (x/N), where T is the si-Periodicity of the concerned SI message and N is the number of slots in a radio frame. Moreover, the UE can receive the PDCCH containing the scheduling RNTI, for example an SI-RNTI in the PDCCH monitoring occasion(s) for SI message acquisition, from the start of the SI-window and can continue monitoring until the end of the SI-window whose absolute length in time is given by si-WindowLength, or until the SI message was received. If the SI message was not received by the end of the SI-window, the UE can repeat reception at the next SI-window occasion for the concerned SI message in the current modification period. There may be various caveats, conditions, and exceptions to this monitoring approach, which is provided simply by way of an example of a terrestrial-only approach.

This terrestrial-only approach to an SI modification acquisition process may not provide or guarantee the right timing understanding of the new acquired value at both ends UE and gNB at the same time. In terrestrial-only procedures, this approach may have no impact in ongoing transmissions in such a fine granularity as it does in NTN. Therefore, certain embodiments may be applied to NTN instead of or in addition to the above-described procedures.

In terrestrial-only approaches, changing information provided in SIBs other than SIB1 may not be seen as crucial for system operation, but for NTN, as the information provided is related to the actual UE transmit timing, it may be valuable that both UE and gNB have the same understanding of when to apply and expect the updated values.

Figure 2:
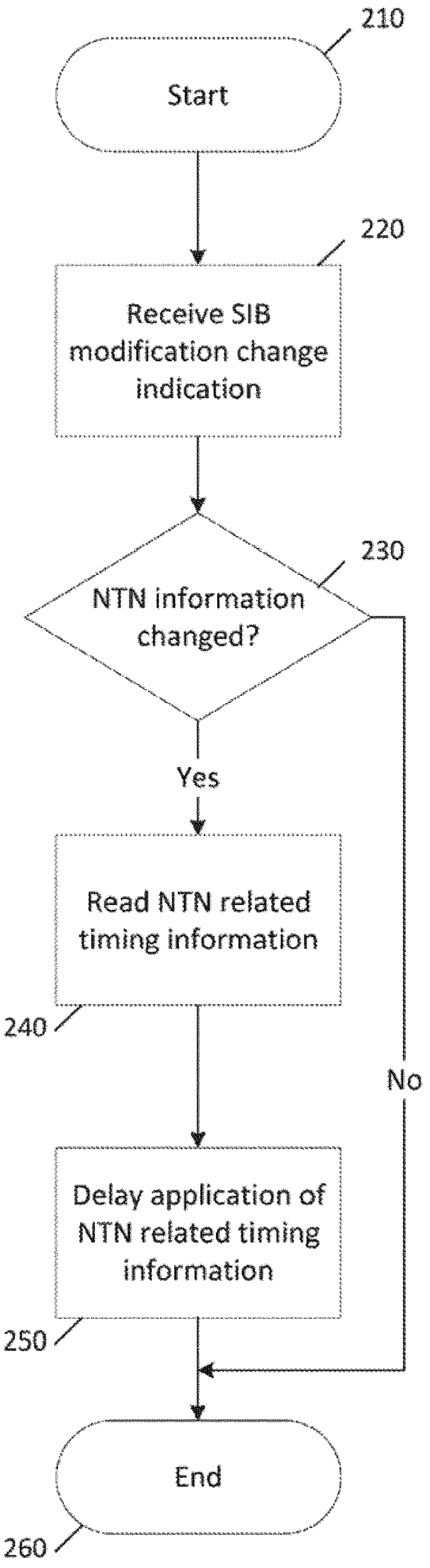
FIG. 2 illustrates a method according to certain embodiments.

FIG. 2 illustrates a method according to certain embodiments. As shown in FIG. 2, the method can start at 210. At 220, the UE can receive SIB modification change indication at 220. At 230, the UE can determine whether NTN information changed. If not, the method can end at 260. Otherwise, at 240, the UE can read NTN-related timing information. Furthermore, at 250, the UE can delay application of the NTN-related timing information before the method ends at 260.

Certain embodiments provide a new framework for handling the acquisition of modified or updated SIs, maintaining a synchronous understanding of the acquisition period in both ends: UE and gNB.

Figure 3:
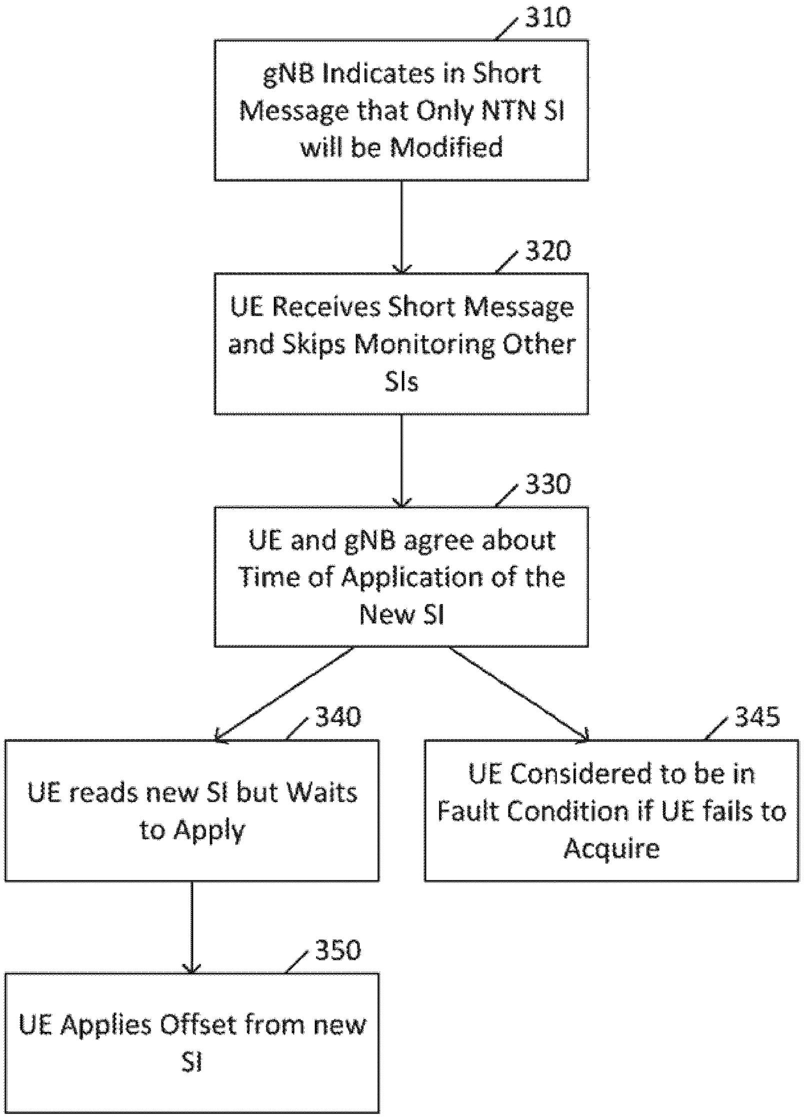
FIG. 3 illustrates a further method according to certain embodiments.

FIG. 3 illustrates a further method according to certain embodiments. As shown in FIG. 3, at 310, in a short message that triggers a SI modification, the gNB can indicate that only the NTN SI will be modified. Additional details of how to indicate the SI modification and other nuances of this indication are discussed below.

At 320, the UE can receive the short message and know that the UE needs to reacquire specifically the new NTN SI. The UE can consequently skip monitoring of other SIs in the next modification period. More particularly, by reading the short message based on the rules exemplified above the UE can know that the NTN SI is modified, and that the K_offset has been potentially modified. The UE can know that there may be uncertainty as to the transmission timing if a new SI is not acquired.

At 330, the UE and gNB can agree about the time of application of the new SI. This time of application can also be referred to as a point of application. The agreement can be reached through pre-defined timing relations, either through specification(s) or through pre-configuration. There may not be a need for any negotiation between the UE and gNB to reach the agreement. Thus, in this context, the agreement can refer to a common understanding.

The application point can be a matter of common or shared understanding between UE and gNB. For example, the application point can be defined in terms of a number of “SI-windows”. For instance, the application point can start at the end of the x-th SI-Window for the NTN SIB, counting from the first SI-window initiated in the current modification period. The application point or time of application can be expressed in a variety of ways. For example, the application point or time of application can be expressed in terms of a duration of at least one of a number of system information windows, a timer, a number of system information periods, a system information modification period, a number of subframes, or a number of slots.

In another example, the application point can be defined as the end of the current modification period. This means UE may have to acquire the new SI within the modification period. The previous example may permit the UE to react more quickly than this example.

In a further example, the “number” of “time units” (SI-Windows, slots, subframes, radio frames, modification coefficient, or the like) to be counted to define the application point may be present on the previous stored version of the NTN SIB. Thus, as mentioned above, the application point or time of application can be expressed in terms of a duration of a number of system information windows, a timer, a number of system information periods, a system information modification period, a number of subframes, or a number of slots. Other ways of expressing the application point or time of application are also permitted.

In a yet further example, the “number” of “time units” (SI-Windows, slots, subframes, radio frames, modification coefficient, or the like) to be counted to define the application point may be present on SIB1.

In an additional example, the “number” of “time units” (SI-Windows, slots, subframes, radio frames, modification coefficient, or the like) to be counted to define the application point, may be set UE-specifically depending on the type of services running at the UE side.

At 340, the UE can read the new SI in the next modification period, but can wait to apply the new value. Then, at 350, the UE can apply the new K_offset when the point of application arrives. Alternatively, as illustrated at 345, if the UE fails to acquire the new SI before the point of application, the UE can be considered to be at fault in terms of K_offset. Various procedures can be taken by the UE in response to the determination that the UE is in a fault condition with respect to K_offset.

Updates on satellite ephemeris and common delay may not be expected to trigger SI updates. The use of a validity timer can indicate that the UE is allowed to skip one or more readings of the serving satellite ephemeris information or common TA information.

As mentioned above, certain embodiments may provide a new signaling framework for handling the acquisition of modified or updated SIs, and based on such framework the gNB can provide indication of NTN related modifications in a particular SI.

The indication my contain a hard indication for SI modification or a soft indication of SI modification and the hard modification or soft modification can be signaled to the UE. The indication type can provide information to the UE on whether reading this SI is mandatory or only recommended by the gNB. A hard modification can refer to a case in which the user equipment is required by the gNB to reacquire the modified version of the system information block. A soft modification can refer to a case where information has been updated but the UE is not required to reacquire SI if the UE has a valid version of the system information block. The user equipment may decide to not acquire the modified version of the system information when the modification is flagged as soft.

Upon acquiring the hard indication, the UE can re-acquire the related NTN SIs and skip the unnecessary SIs, for example those Sis not modified.

Upon acquiring the soft indication the UE can decide if the UE itself needs to re-acquire the soft-modified information. For example, the UE may need to re-acquire in view of an early renewal of ephemeris validity timer before DRX sleep time.

The signaling can be implemented by using the existing structure and available resources/bits of the DCI.

More particularly, the NTN related information updates can have various aspects. According to one aspect, the short message can trigger a SI modification, indicating a change in the NTN SIB. This can be implemented by using one of the spare bits in the Short Message. For example, if bit 4 is "on" then the UE can know that the NTN SI was modified.

In order to avoid "spending" the spare bits that can be used for other uses in future (sidelink, v2x, redcap, etc), the condition may be combined with the presence of the NTN SIB.

According to certain embodiments, various rules may be implemented. These rules are identified numerically simply for ease of reference and convenience, and not by of limitation, preference, or priority.

According to rule 1, if bit 4 is on AND NTN SI is present in the SI configuration (NTN cell indication) then, the NTN SI has been updated. Otherwise, if NTN SI is not present, bit 4 can be used for other purposes.

Depending on the available bits, the short message can also indicate which type of change applies to the particular SIB from a predefined number of options. For example, the change can depend on which information or subset of information, such as ephemeris, Common TA, TA drift rate, or the like, is updated.

There can be a hard versus soft modification indication, as mentioned above. In the above-described terrestrial-only procedure, bit 1 can be used to indicate a hard SI modification. After this is received the UE must re-acquire all SIs in that approach. In the procedure according to certain embodiments, a soft indication can be added to the realm of possibilities. In this case, the bit 1 can be combined with bit 4. This can lead to two further rules. According to rule 2, if bit 4 is flagged, per rule 1 the UE knows NTN related SI information has been updated. The bit 1 can provide the soft vs hard modification. If bit 1 is flagged, this is a hard modification. According to rule 3, if bit 4 is flagged but bit 1 is not flagged, this is a soft modification.

Table 2 illustrates information conveyed by the gNB to the UEs and UE actions upon reception of the short message transmitted with P-RNTI over DCI, according to certain embodiments.

TABLE 2

| Is NTN SI information present? | Bit 1 | Bit 4 | Action |
|---|---|---|---|
| YES | 0 | 0 | No action (legacy) |
| | 1 | 0 | Re-acquire SIBs. NTN SIB may be skipped. |
| | 0 | 1 | Soft indication of NTN SI modification(ex: ephemeris, common delay, etc) |
| | 1 | 1 | Hard indication. NTN SI must be reacquired |
| NO | 1 | 0 | Legacy indication of SI modification |
| | x | 1 | Reserved for future use |

Upon reception of the hard indication, the UE may reacquire only NTN SI or all SIs containing NTN specific parameters, such as ephemeris, common delay, k_offset, k_mac, scenario type, doppler pre-compensation, or the like. Depending on whether the indication provides details on which exact NTN specific information is being updated, the UE may limit the NTN SI reading to the fields containing new information, if they are in different SIs.

A standard specification may indicate that SIB 1 or other SIBs should also be re-acquired as per hard modification indication. Nevertheless, the UE may skip the procedure for acquiring unnecessary SIs, saving time.

UE behavior upon reception of soft indication may vary, with the following being some examples of possible implementations.

The UE may not be expected to re-acquire the NTN SI or the SI information upon a soft indication. The UE may nevertheless decide to do such a re-acquisition depending on, for example, the validity timer status, available power, or the like. Such a re-acquisition may be done, for example, if the UE wants to update the version of the ephemeris information or common delay function stored within the validity timer but also wants to avoid reading a SI. The UE may want to avoid reading a SI where the SI only has the same information as the UE already has or information that is not transmitted for the first time, and consequently may be aged. This can prevent unnecessary waste of power by the UE.

If the UE wants to renew the ephemeris, or common delay, information before going into sleep mode, which could cause the validity timer to expire, the UE may do so. In this case the re-acquisition of other SIs may be completely skipped.

Figure 4:
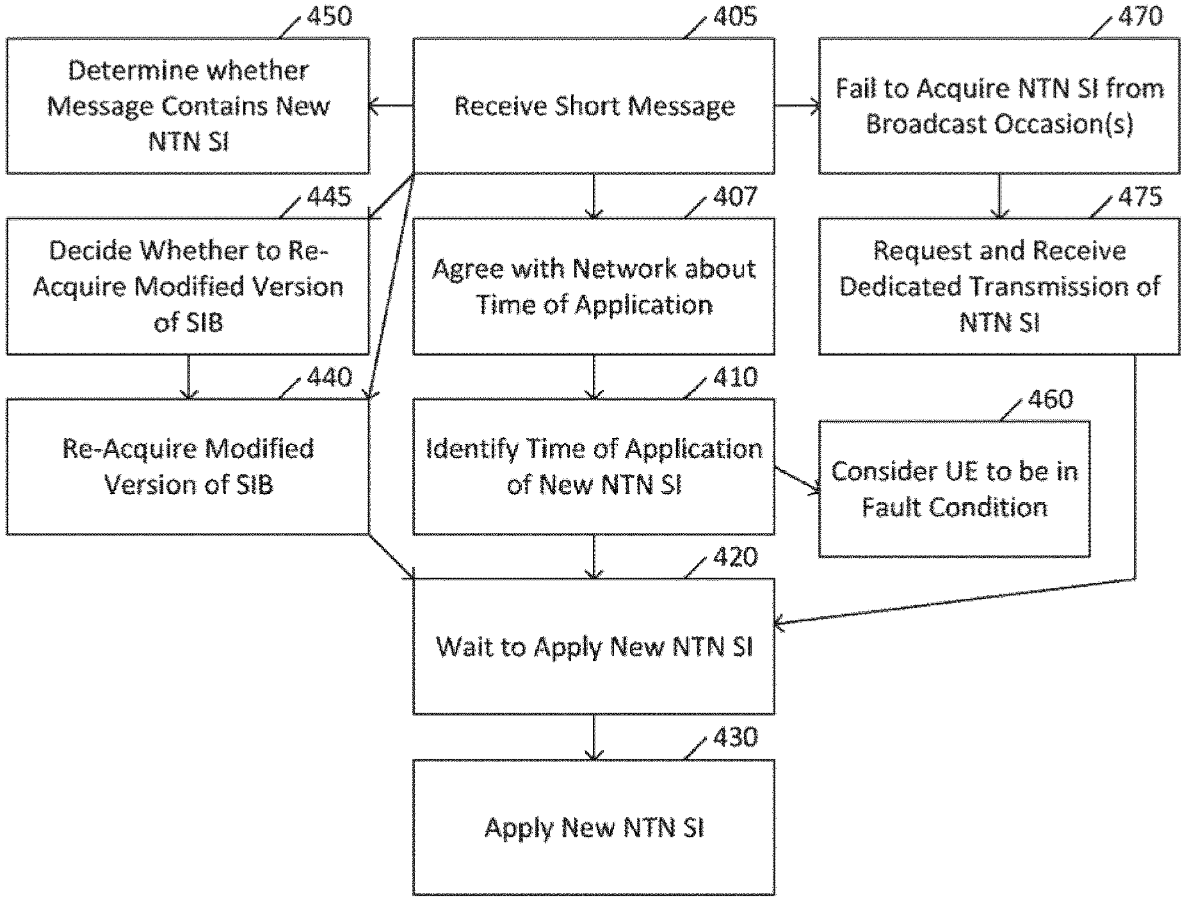
FIG. 4 illustrates an example flow diagram of a method, according to an embodiment.

FIG. 4 illustrates an example flow diagram of a method for providing management of updates in scheduling offset via system information and soft indication of system information modification, according to certain embodiments.

The method can include, at 410, identifying, by a user equipment, a time of application of a new non-terrestrial-network system information. The method can also include, at 420, waiting to apply the new non-terrestrial-network system information until the time of application. The method can further include, at 430, applying the new non-terrestrial-network system information at the time of application, conditioned on the new non-terrestrial-network system information being received before the time of application.

The applying the new non-terrestrial-network system information can include applying an offset value.

The offset value can be configured to be applied to at least one of the following: a transmission timing of downlink control information scheduled physical uplink shared channel, a transmission timing of random access response grant scheduled physical uplink shared channel, a transmission timing of hybrid automatic repeat request acknowledgment on physical uplink control channel, a channel state information reference resource timing; or a transmission timing of aperiodic sounding reference signal.

The offset value can include at least one of a cell-specific offset value, a beam-specific value, a beam group specific value, or a group-specific value for a group of UEs.

The method can further include, at 405, receiving a message comprising a change indication indicating that an existing non-terrestrial-network system information will be modified. The message can be a short message. The method can further include, at 407, agreeing with or identifying a shared understanding with a network element regarding the time of application of the new non-terrestrial-network system information in response to receiving the message. The identifying the shared understanding or agreeing can include receiving a network indication of the time of application. The identifying the shared understanding can include identifying the time of application previously configured by the network. For example, a network configuration can set the time of application. The identifying the shared understanding can include identifying the time of application from implicit indication of the time of application. The identifying the shared understanding can include identifying the time of application previously configured by a communication standard. For example, a manufacturer of the user equipment can configure the user equipment based on a standard. As mentioned above, the application point or time of application can be expressed in terms of one or more of a duration of at least one of a number of system information windows, a timer, a number of system information periods, a system information modification period, a number of subframes, or a number of slots.

The message can indicate a type of change of the modification. The type of change can be a hard modification or a soft modification. The soft indication can indicate that a specific subset of parameters has been modified within a system information block.

The message can indicate the modification using a first flag. The first flag here can refer to the contents of the message, for example a first active bit.

The message can include the first flag and the new non-terrestrial-network system information.

The message can include a second flag indicative of whether the modification is a hard modification. The second flag here can refer to the contents of the message, for example a second active bit. The first active bit and second active bit do not have to be in any particular order with one another, thus first and second are simply to distinguish the bits, not to indicate order, priority, or preference.

The method can also include, at 440, re-acquiring a modified version of system information block conditioned on the second flag indicating that the modification is a hard modification.

The message can include a second flag indicative of whether the modification is a soft modification. The method can further include, at 445, deciding, by the user equipment, whether to acquire a modified version of system information block based on at least one criterion. The deciding can be conditioned on the second flag indicating that the modification is a hard modification.

The method can further include, at 450, determining whether the new non-terrestrial-network system information is present in the message. The method can additionally include determining the modification to be made based on a combination of the presence of the new non-terrestrial-network system information, the first flag, and the second flag.

The method can additionally, include, at 460 considering the user equipment to be at fault in terms of the offset value conditioned on failing to receiving the new non-terrestrial-network system information before the time of application.

The time of application can be expressed in terms of a duration of at least one of a number of system information windows, a timer, a number of system information periods, a system information modification period, a number of subframes, or a number of slots.

The new non-terrestrial-network system information can be received via a broadcast message or can be received in a dedicated message or other dedicated transmission.

The dedicated message can be or include a radio resource control message, such as an RRC configuration or RRC reconfiguration message.

The method can also include, at 375, requesting (and receiving) a dedicated transmission of the new non-terrestrial-network system information before the time of application after receiving a modification indication.

The requesting can be conditioned on the user equipment failing, at 370, to acquire the new non-terrestrial-network system information during at least one broadcast occasion before the time of application.

It is noted that FIG. 4 is provided as one example embodiment of a method or process. However, certain embodiments are not limited to this example, and further examples are possible as discussed elsewhere herein.

Figure 5:
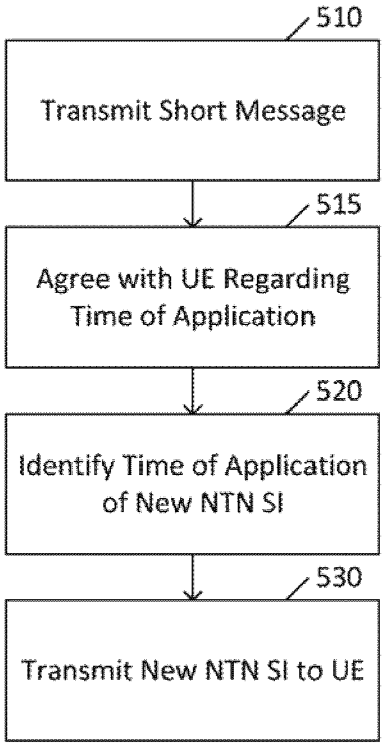
FIG. 5 illustrates an example flow diagram of a method, according to an embodiment.

FIG. 5 illustrates an example flow diagram of a method for providing management of updates in scheduling offset via system information and soft indication of system information modification, according to certain embodiments. The method of FIG. 5 can be used alone or in combination with the method of FIG. 4.

The method can include, at 510, providing, to a user equipment, a message indicating that an existing non-terrestrial-network system information will be modified. The message can be a short message. The method can also include, at 520, identifying a time of application of a new non-terrestrial-network system information. The method can further include, at 530, transmitting the new non-terrestrial-network system information toward a user equipment.

The new non-terrestrial-network system information can, as noted above, include an offset value. The offset value can be configured to be applied to a variety of timings. For example, the offset value can be applied to a transmission timing of downlink control information scheduled physical uplink shared channel, a transmission timing of random access response grant scheduled physical uplink shared channel, a transmission timing of hybrid automatic repeat request acknowledgment on physical uplink control channel, a channel state information reference resource timing; or a transmission timing of aperiodic sounding reference signal.

The offset value can be at least one of a cell-specific offset value, a beam-specific value, a beam group specific value, or a group-specific value for a group of UEs.

The transmitting the message can include providing in the message a change indication indicating that an existing non-terrestrial-network system information will be modified. The method can also include, at 515, agreeing with a user equipment regarding the time of application of the new non-terrestrial-network system information, wherein the agreeing is determined by sending the message.

The message can indicate a type of change of the modification. For example, the type of change can be a hard modification or a soft modification. The soft indication can indicate a specific subset of parameters has been modified within a system information block.

The message can indicate the modification using a first flag. The message can include the first flag and the new non-terrestrial-network system information.

The message can include a second flag indicative of whether the modification is a hard modification or a soft modification.

As mentioned above, the time of application can be expressed in terms of a duration of at least one of a number of system information windows, a timer, a number of system information periods, a system information modification period, a number of subframes, or a number of slots.

It is noted that FIG. 5 is provided as one example embodiment of a method or process. However, certain embodiments are not limited to this example, and further examples are possible as discussed elsewhere herein.

Figure 6A:
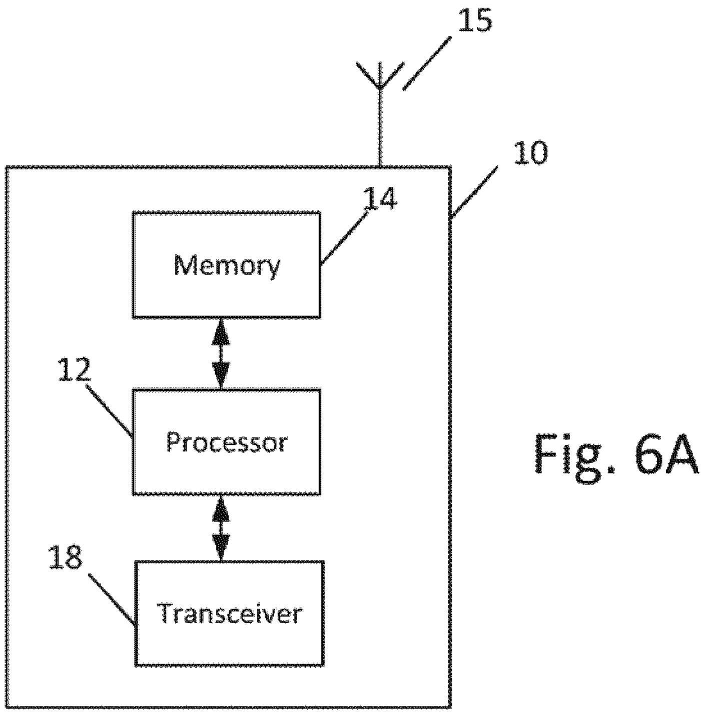
FIG. 6A illustrates an example block diagram of an apparatus, according to an embodiment.

FIG. 6A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6A.

As illustrated in the example of FIG. 6A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing management of updates in scheduling offset via system information and soft indication of system information modification, for example.

Figure 6B:
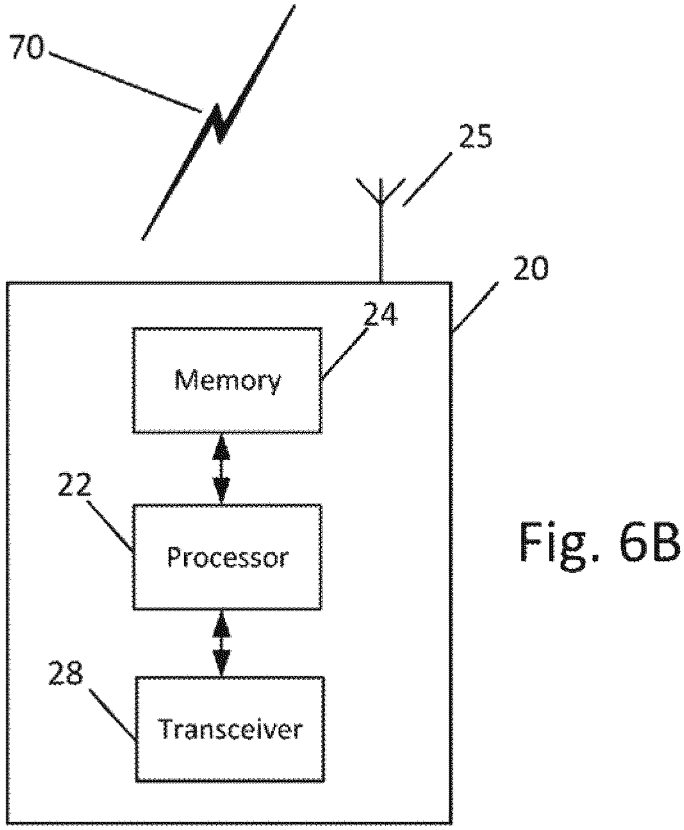
FIG. 6B illustrates an example block diagram of an apparatus, according to an embodiment.

FIG. 6B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6B.

As illustrated in the example of FIG. 6B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5, or any other method described herein. For example, in an embodiment, apparatus 20 may be controlled to perform a process relating to providing management of updates in scheduling offset via system information and soft indication of system information modification, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may maintain NTN principles, such as that ephemeris and common delay information should not trigger SI modifications obligating UEs to re-acquire all SIs. Furthermore, certain embodiments may provide a technical solution for the indication of NTN SI modification only. Depending on this, the UEs can selectively read the NTN SI, so as to avoid reading the same information multiple times. Moreover, the UEs can also know in advance when new information will be provided, so that the UEs can avoid validity timer expiration. At the same time, the UEs can acquire information at the point in time where the information is as up-to-date as possible. The network may indicate ephemeris data is updated without the need to have all UEs re-acquiring SI, wasting the power of the UEs. Overall, this signaling framework may allow the UEs to read the SI more efficiently and save valuable computational resources and power.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

SI System Information
NTN Non-Terrestrial Network
SIB System Information Block
UE User Equipment
gNB Next Generation Node B

We claim:

1. An apparatus, comprising:
at least one processor; and
at least one memory including computer program instructions,
wherein the at least one memory and the computer program instructions are configured to, with the at least one processor, cause the apparatus at least to:
identify, by a user equipment, a time of application of a new non-terrestrial-network system information;
wait to apply the new non-terrestrial-network system information until the time of application; and
apply the new non-terrestrial-network system information at the time of application, conditioned on the new non-terrestrial-network system information being received before the time of application.

2. The apparatus of claim 1, wherein applying the new non-terrestrial-network system information comprises applying an offset value.

3. The apparatus of claim 2, wherein the offset value is configured to be applied to at least one of a transmission timing of downlink control information scheduled physical uplink shared channel, a transmission timing of random access response grant scheduled physical uplink shared channel, a transmission timing of hybrid automatic repeat request acknowledgment on physical uplink control channel, a channel state information reference resource timing, a transmission timing of aperiodic sounding reference signal, downlink and uplink timing difference at a base station, or application of medium access control procedures initiated by network signaling.

4. The apparatus of claim 2, wherein the offset value comprises at least one of a cell-specific offset value, a beam-specific value, a beam group specific value, or a user equipment group-specific value.

5. The apparatus of claim 2, wherein the at least one memory and the computer program instructions are configured to, with the at least one processor, cause the apparatus further to perform:
consider the user equipment to be at fault in terms of the offset value conditioned on failing to receiving the new non-terrestrial-network system information before the time of application.

6. The apparatus of claim 1, wherein the at least one memory and the computer program instructions are configured to, with the at least one processor, cause the apparatus further to perform:
receive a message comprising a change indication indicating that an existing non-terrestrial-network system information will be modified; and
identify a shared understanding with a network element regarding the time of application of the new non-terrestrial-network system information in response to receiving the message.

7. The apparatus of claim 6, wherein identifying the shared understanding comprises receiving a network indication of the time of application.

8. The apparatus of claim 6, wherein identifying the shared understanding comprises identifying the time of application previously configured by the network or a communication standard.

9. The apparatus of claim 6, wherein the identifying the shared understanding comprises identifying the time of application from implicit indication of the time of application.

10. The apparatus of claim 6, wherein the message indicates a type of change of the modification, wherein the type of change comprises one of a hard modification or a soft modification, wherein the soft indication indicates a specific subset of parameters has been modified within a system information block.

11. The apparatus of claim 6, wherein the message comprises a first flag and the new non-terrestrial-network system information, wherein the first flag indicates the modification.

12. The apparatus of claim 11, wherein the message comprises a second flag indicative of whether the modification is a hard modification, wherein the at least one memory and the computer program instructions are configured to, with the at least one processor, cause the apparatus further to perform:
re-acquire a modified version of system information block conditioned on the second flag indicating that the modification is a hard modification.

13. The apparatus of claim 11, wherein the message comprises a second flag indicative of whether the modification is a soft modification, wherein the at least one memory and the computer program instructions are configured to, with the at least one processor, cause the apparatus further to perform:
decide, by the user equipment, whether to acquire a modified version of system information block based on at least one criterion, wherein the deciding is conditioned on the second flag indicating that the modification is a hard modification.

14. The apparatus of claim 1, wherein the time of application is expressed in terms of a duration of at least one of a number of system information windows, a timer, a number of system information periods, a system information modification period, a number of subframes, or a number of slots.

15. The apparatus of claim 1, wherein the new non-terrestrial-network system information is received via a broadcast message.

16. The apparatus of claim 1, wherein the new non-terrestrial-network system information is received via a dedicated message, the dedicated message comprising a radio resource control message.

17. The apparatus of claim 1, wherein the at least one memory and the computer program instructions are configured to, with the at least one processor, cause the apparatus further to perform:
request a dedicated transmission of the new non-terrestrial-network system information before the time of application after receiving a modification indication.

18. The apparatus of claim 17, wherein the requesting is conditioned on the user equipment failing to acquire the new non-terrestrial-network system information during at least one broadcast occasion before the time of application.

19. An apparatus, comprising:
at least one processor; and
at least one memory including computer program instructions,
wherein the at least one memory and the computer program instructions are configured to, with the at least one processor, cause the apparatus at least to:
provide, to a user equipment, a message indicating that an existing non-terrestrial-network system information will be modified;
identify a time of application of a new non-terrestrial-network system information; and
transmit the new non-terrestrial-network system information toward a user equipment.

20. A method, comprising:
identifying, by a user equipment, a time of application of a new non-terrestrial-network system information;
waiting to apply the new non-terrestrial-network system information until the time of application; and
applying the new non-terrestrial-network system information at the time of application, conditioned on the new non-terrestrial-network system information being received before the time of application.

* * * * *